US010185938B2

(12) United States Patent
Dix

(10) Patent No.: US 10,185,938 B2
(45) Date of Patent: Jan. 22, 2019

(54) METHODS AND SYSTEMS FOR PRODUCT IDENTIFICATION AND COMPUTER ROUTING SERVICES

(71) Applicant: MasterCard International Incorporated, Purchase, NY (US)

(72) Inventor: Simon R. Dix, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 552 days.

(21) Appl. No.: 14/861,525

(22) Filed: Sep. 22, 2015

(65) Prior Publication Data

US 2017/0083877 A1 Mar. 23, 2017

(51) Int. Cl.
*G06Q 20/08* (2012.01)
*G06Q 20/20* (2012.01)
*G06Q 20/34* (2012.01)

(52) U.S. Cl.
CPC ......... *G06Q 20/085* (2013.01); *G06Q 20/202* (2013.01); *G06Q 20/34* (2013.01)

(58) Field of Classification Search
CPC ........ G06Q 10/00; G06Q 20/36; G06Q 20/00; G06Q 40/00; G06Q 20/20; G06Q 20/02; G06Q 20/40
USPC .......... 705/44, 72, 41, 39, 40; 235/379, 380, 235/383; 455/410
See application file for complete search history.

(56) References Cited

U.S. PATENT DOCUMENTS

| 5,945,653 | A | 8/1999 | Walker et al. |
|---|---|---|---|
| 7,747,536 | B2 | 6/2010 | McGee et al. |
| 8,317,094 | B2 | 11/2012 | Lehman |
| 8,407,141 | B2 * | 3/2013 | Mullen ................ G06Q 20/04 380/201 |
| 8,788,429 | B2 | 7/2014 | Tieken |
| 9,479,818 | B2 * | 10/2016 | Muterspaugh ......... H03H 7/466 |
| 2004/0064373 | A1 | 4/2004 | Shannon |
| 2007/0119918 | A1 | 5/2007 | Hogg et al. |
| 2007/0205275 | A1 * | 9/2007 | Nicola ................. G06Q 20/20 235/383 |

(Continued)

OTHER PUBLICATIONS

PCT International Search Report and Written Opinion, Application No. PCT/US2016/051602, dated Dec. 13, 2016, 8 pps.

*Primary Examiner* — Olusegun Goyea
(74) *Attorney, Agent, or Firm* — Armstrong Teasdale LLP

(57) ABSTRACT

A method and system for managing payment card transaction instructions at a point of interaction (POI) device. The method includes storing one or more payment card transaction instructions received from an entity responsible for a plurality of payment cards usable with the POI device wherein the payment card transaction instructions are associated with at least one of a brand and a product of the entity. The method further includes receiving, from a merchant, a payment card identifier before or during a payment card transaction, the payment card identifier including a plurality of fields. The method also includes communicating to the central store at least a portion of one or more of the plurality of fields and transmitting the one or more payment card transaction instructions to the POI device, from the central store, that correspond to the one or more payment card transaction instructions associated with the payment card identifier.

20 Claims, 8 Drawing Sheets

(56) References Cited

U.S. PATENT DOCUMENTS

| | | | |
|---|---|---|---|
| 2007/0282743 A1* | 12/2007 | Lovelett | G06Q 20/10 705/40 |
| 2011/0082792 A1* | 4/2011 | Ballard | G06Q 20/02 705/44 |
| 2012/0310826 A1* | 12/2012 | Chatterjee | G06Q 20/36 705/41 |
| 2013/0212020 A1* | 8/2013 | Turgeon | G06Q 20/3821 705/44 |
| 2014/0279474 A1* | 9/2014 | Evans | G06Q 20/3572 705/41 |
| 2015/0026070 A1 | 1/2015 | Groarke et al. | |
| 2015/0112872 A1* | 4/2015 | Sadiq | G06Q 20/4012 705/72 |
| 2015/0154572 A1 | 6/2015 | Von Nothaus et al. | |
| 2015/0220898 A1 | 8/2015 | Priebatsch | |
| 2017/0200162 A1* | 7/2017 | Pourfallah | G06Q 20/3276 |
| 2017/0243199 A1* | 8/2017 | Kalgi | G06Q 20/12 |
| 2018/0012147 A1* | 1/2018 | Hammad | G06Q 10/00 |

* cited by examiner

METHODS AND SYSTEMS FOR PRODUCT IDENTIFICATION AND COMPUTER ROUTING SERVICES

BACKGROUND

This disclosure relates generally to identifying a brand or product associated with a payment device, such as, but not limited to a payment token or user computing device (collectively referred to as a "payment card") during a payment transaction and, more particularly, to computer systems and computer-based methods for facilitating payment card transactions with special processing instructions transmitted to a point of interaction (POI) device used in the payment card transaction.

Known POI devices are provided with little computing resources due to the nature of the originally intended function of POI devices. However, over time, additional functions have been envisioned but have not been able to be satisfied due to the limited computing resources and the expense of upgrading the computing capability or the entire POI device.

Currently a terminal of a POI device transmits relatively basic information from a payment card to the POI device, for example, a payment card number, an expiration date, an amount of the transaction, and the like. The actual construction of the authorization message and which format to use and then subsequently which routing should be used for the message may occur at the POI device or a downstream server.

To make use of the payment card number, a portion referred to as a bank identification number (BIN) is provided on a daily basis to all participants in a particular payment scheme/brand. A list of the BINs the payment card network has issued, or can manage transactions and routing for that are valid is transmitted to the card scheme/brand customers primarily targeted towards the acquirer customers. The BIN can be used to indicate a limited amount of information about the payment card being used. The BIN can indicate a variety of brands or product associated with the payment card. The BIN can indicate if the payment card is a prepaid gift card or a prepaid reloadable card, debit, or credit card. The update of the list of BINs is done in a batch process that is typically updated or published once every twenty-four hours for use in the subsequent clearing of transactions but it can also be used in the authorization routing decision. However, the information that can be stored or logically determined at the POS is limited due to the limited computing resources.

BRIEF DESCRIPTION

In one embodiment, a computer-based method of managing payment card transaction instructions at a point of interaction (POI) device communicatively coupled to a payment card network is provided. The method is implemented using a computer device coupled to a memory device. The method includes storing at a central store, one or more payment card transaction instructions received from an entity responsible for a plurality of payment cards usable with the POI device, the one or more payment card transaction instructions associated with at least one of a brand and a product of the entity. The method further includes receiving, from a merchant, a payment card identifier before or during a payment card transaction, the payment card identifier including a plurality of fields. The method also includes communicating to the central store at least a portion of one or more of the plurality of fields and transmitting the one or more payment card transaction instructions to the POI device, from the central store, that correspond to the one or more payment card transaction instructions associated with the payment card identifier.

In another embodiment, a computer system for payment system product identification and routing service (PIRS) includes a central store including one or more payment card transaction instructions received from an entity responsible for a plurality of payment cards usable with a point of interaction (POI) device. The one or more payment card transaction instructions are associated with at least one of a brand and a product of the entity. The computer device is configured to receive, from a merchant, a payment card identifier before or during a payment card transaction wherein the payment card identifier includes a plurality of fields. The computer device is further configured to communicate to the central store at least a portion of one or more of the plurality of fields and to transmit the one or more payment card transaction instructions to the POI device from the central store that correspond to the one or more payment card transaction instructions associated with the payment card identifier.

In yet another embodiment, one or more non-transitory computer-readable storage media having computer-executable instructions embodied thereon, wherein when executed by at least one computer device, the computer-executable instructions cause the computer device to receive, from a point of interaction (POI) device, a payment card identifier before or during a payment card transaction, the payment card identifier including a plurality of fields. The computer-executable instructions further cause the computer device to communicate to the central store at least a portion of one or more of the plurality of fields. The computer-executable instructions also cause the computer device to transmit the one or more payment card transaction instructions to the POI device, from the central store, that correspond to the one or more payment card transaction instructions associated with the payment card identifier.

BRIEF DESCRIPTION OF THE DRAWINGS

FIG. 1 is a schematic diagram illustrating an enhanced multi-party payment card system for enabling identification of a brand and/or a product in a payment card transaction and providing instructions for processing and routing the messages associated with the payment card transaction.

FIG. 2 is a simplified block diagram of an example payment processing system in accordance with one embodiment of the present disclosure.

FIG. 3 is an expanded block diagram of an example embodiment of a server architecture of the payment processing system shown in FIG. 2 in accordance with one embodiment of the present disclosure.

FIG. 4 illustrates an example configuration of a client computing device.

FIG. 5 illustrates an example configuration of a server computing device.

FIG. 6 is a data flow diagram for the Product Identification and Routing Service shown in FIG. 1.

FIG. 7 shows a configuration of database associated with the database server shown in FIG. 2 of the server system shown in FIG. 2 with other related server components.

FIG. 8 is a flow chart of a method of managing payment card transaction instructions at a point of interaction (POI) device communicatively coupled to a payment card network.

DETAILED DESCRIPTION

Figure 1:
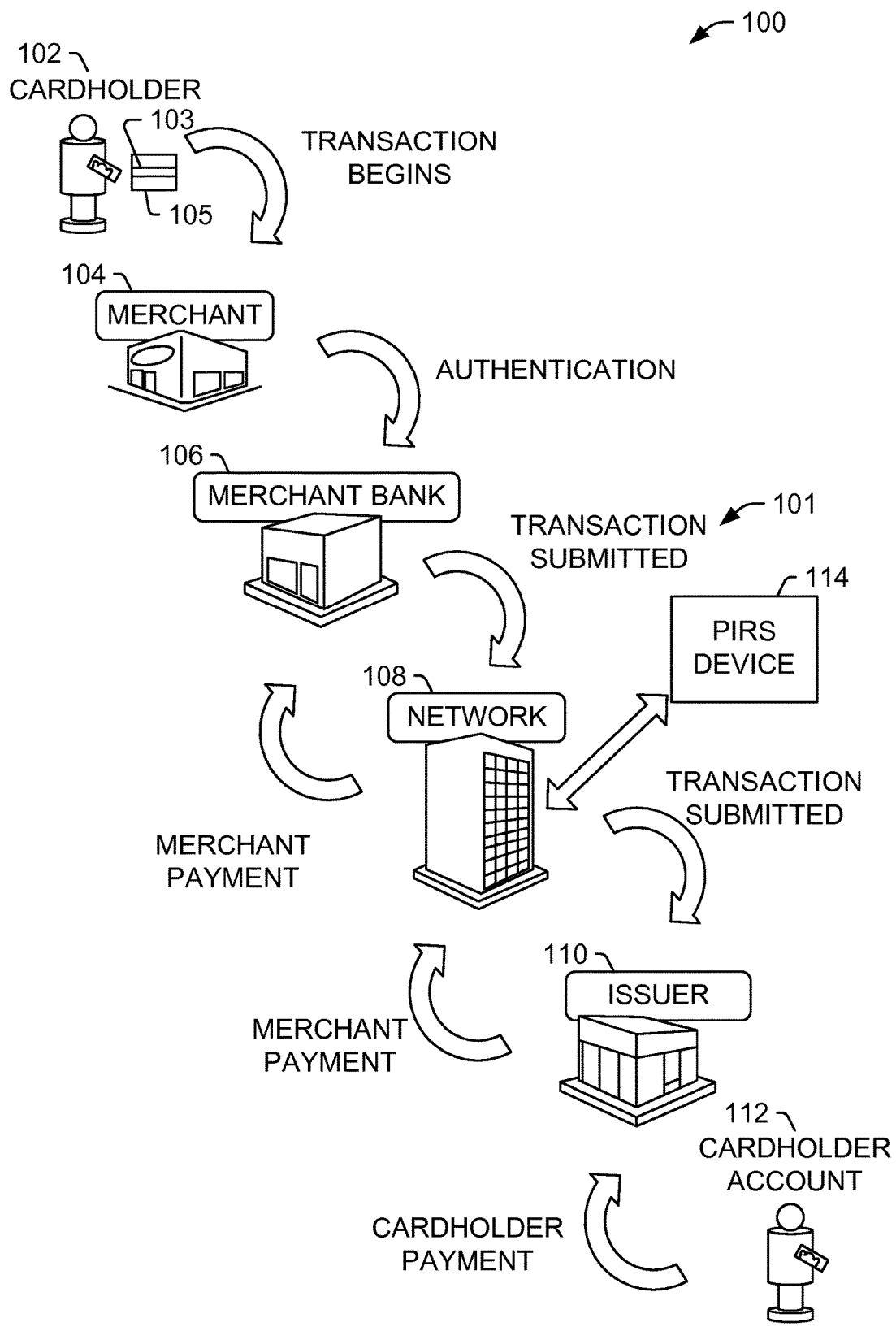
FIGS. 1-8 show example embodiments of the methods and systems described herein.

Embodiments of a Product Identification and Routing Service (PIRS) are described herein. Specifically, the PIRS is a computer-implemented system configured for identifying a brand and/or a product in a payment card transaction and providing instructions for processing and routing the messages associated with the transaction. As used herein, "brand" or "product" refers to a program by which the payment card transaction is processed for an entity. This is as opposed to a "brand" or "product" of an article or service that is the subject of the payment card transaction. Typically, payment card transactions using a multi-party payment card network are initiated at a merchant point of sale (POS) device or other POI device in what is known as a card present transaction. An increasing number of transactions are also initiated in card-not-present (CNP) transactions, such as, but not limited to, mobile device transactions, phone transactions, online transactions, card on file and periodic transactions. As used herein, a point of interaction refers to any of the different ways a purchaser or cardholder can interact with a merchant to effect a purchase. For example, a POS device, a smart phone and a website are all forms of a POI device. Additionally, other techniques for communicating purchase transaction data between the cardholder and the merchant or the merchant's agent can also be considered POI devices.

Currently, when a payment device, such as, but not limited to a payment card is swiped, dipped, tapped or bumped at a POS device, the POS device reads a numeric identifier from the payment card, which may be printed, embossed, stored in a magnetic stripe, or in a memory of the card, in the case of a smart card or other payment card having an ability to electronically store the numeric identifier. The numeric identifier is typically referred to a primary account number (PAN) that may currently be 8-19 digits long and include several fields reserved for particular uses. For example, when following the International Organization for Standardization (ISO) standards, the first six digits are referred to as an Issuer Identification Number (IIN) or Bank Identification Number (BIN), the first digit of which is Major Industry Identifier (MII). The IIN identifies the institution that issued the card to the cardholder. The next field, which may be of a variable length, identifies an individual account. A single check digit typically occupies the last digit.

Currently, determinations of any special instructions or requirements associated with the PAN are made at the POS device based on information associated with the BIN. The POS device analyzes the BIN and is programmed to recognize a meaning associated with various digits of the BIN. For example, if the BIN starts with 51-55 or 222100 to 272099 then it is a MasterCard brand card, etc. All the POS devices must be programmed this way, which does not allow for easy modification of the program or modifications on the fly. For example, a fleet operator issuing credit cards to its drivers may require the entry of a license number of the driver, license number of the vehicle, and a verification that only gasoline was purchased as part of the transaction. The current POS devices have little computing resources and consequently special requirements as described above may be difficult to enforce at the POS device.

Current methods of transmitting special requirements to POS devices include offline/batch file delivery of routing and product data (e.g. BIN number, product codes (World Elite, Prepaid Gift Card, Commercial Fleet etc.)) and acceptance brands (MasterCard, Maestro, Cirrus, etc.), and a requirement or preference of the brand for certain transaction circumstances. As commerce progresses, the requirements placed on issuers' cards and the products they include will exceed the ability of the POS device to accommodate those requirements.

Operational parameters for configuration systems profiles, such as, but not limited to, MasterCard's Member Profile Extract (MPE), Financial Institution Table (FIT) files, and routing tables are stored as flat files and are delivered via a bulk/batch file approach that permits update routing information typically only once every 24 hours, unless an emergency push is done.

Currently the payment schemes include a default routing setup between gateways, but such schemes do not permit fast updates of information and creates problems for larger payment card processors, such as, for example, First Data Resources (FDR), Total Systems (TSYS), Vantiv, Worldpay, etc., who have to receive, format and consolidate product and routing data files from all the brands/schemes that they support.

Embodiments, described herein permit changes on the fly and permit an easier changeover of brands, for example, a bank or card issuing institution going from another global payment brand to MasterCard.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, smartphones, personal digital assistants (PDAs), key fobs, and/or computers. Each type of transaction card can be used as a method of payment for performing a payment card transaction.

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIXO server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The following detailed description illustrates embodiments of the disclosure by way of example and not by way of limitation. It is contemplated that the disclosure has general application to processing payment card transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an enhanced multi-party payment card system 100 for enabling identification of a brand and/or a product in a payment card transaction and providing instructions for processing and routing the messages associated with the payment card transaction. In the example embodiment, a Product Identification and Routing Service (PIRS) 101 is incorporated into or communicatively coupled to payment card transaction system 100. The present disclosure relates to an enhancement of a payment card transaction system 100, such as a credit card payment system using the MasterCard® payment card transaction network 108 (also referred to as an "interchange" or "interchange network"). MasterCard® payment card transaction network 108 is a proprietary communications standard promulgated by MasterCard International Incorporated® for the exchange of payment card transaction data between financial institutions that are customers of MasterCard International Incorporated®. (MasterCard is a registered trademark of MasterCard International Incorporated located in Purchase, N.Y.).

In payment card transaction system 100, a financial institution, such as, an issuer 110 issues a payment card 105, such as a credit card account or a debit card account, to a cardholder 102, who uses payment card 105 to tender payment for a purchase from a merchant 104. To accept payment with payment card 105, merchant 104 must normally establish an account with a financial institution that is part of the financial payment system. This financial institution is usually called the "merchant bank" or the "acquiring bank" or "acquirer bank" or simply "acquirer". When a cardholder 102 tenders payment for a purchase with payment card 105 (also known as a financial transaction card), merchant 104 requests authorization from acquirer 106 for the amount of the purchase. The request may be performed over the telephone, but is usually performed through the use of a point-of-interaction terminal, which reads the cardholder's account information from a magnetic stripe 103 on payment card 105 or EMV chip and communicates electronically with the transaction processing computers of acquirer 106. Alternatively, acquirer 106 may authorize a third party to perform payment card transaction processing on its behalf. In this case, the point-of-interaction terminal is configured to communicate with the third party. Such a third party is usually called a "merchant processor" or an "acquiring processor." In some instances, a merchant (e.g., merchant 104) stores payment card information associated with a cardholder (e.g., cardholder 102) and requests authorization from acquirer 106 using the stored payment card information, rather than reading the cardholder's account information from payment card 105 itself (i.e., a card-on-file (COF) transaction).

A portion of the information acquired from the cardholder via either a payment card, a payment device, for example, a smart phone, or by entering data into a user interface, for example, on a webpage is transmitted to PIRS device 114. PIRS device 114 associates the portion of the information to special processing instructions required by, for example, issuer 110. PIRS device 114 transmits the special processing instructions to the POI device used in the transaction. Such instructions may require additional information to be acquired before processing and routing of the payment card transaction data can performed. Additionally, PIRS device 114 or any portion of PIRS 101 can be implemented in a cloud computing environment.

Using payment card transaction network 108, the computers of acquirer 106 or the merchant processor will communicate with the computers of issuer 110, to determine whether the cardholder's account 112 is in good standing and whether the purchase is covered by the cardholder's available credit line or account balance. Based on these determinations, the request for authorization will be declined or accepted. If the request is accepted, an authorization code is issued to merchant 104.

When a request for authorization is accepted, the available credit line or available balance of cardholder's account 112 is decreased. Normally, a charge is not posted immediately to a cardholder's account because electronic payment network schemes, such as MasterCard International Incorporated®, have promulgated rules that do not allow a merchant to charge, or "capture," a payment card transaction until goods are shipped or services are delivered. When a merchant ships or delivers the goods or services, merchant 104 captures the payment card transaction by, for example, appropriate data entry procedures on the point-of-interaction terminal. If a cardholder cancels a payment card transaction before it is captured, a "void" is generated. If a cardholder returns goods after the payment card transaction has been captured, a "credit" is generated.

For PIN debit card transactions, when a request for authorization is approved by the issuer, the cardholder's account 112 is decreased. Normally, a charge is posted immediately to cardholder's account 112. The electronic payment network scheme then transmits the approval to the acquiring processor for distribution of goods/services, or information or cash in the case of an ATM.

After a payment card transaction is captured, the payment card transaction is cleared and settled between merchant 104, acquirer 106, and issuer 110. Clearing refers to the communication of financial data for reconciliation purposes between the parties. Settlement refers to the transfer of funds between the merchant's account, acquirer 106, and issuer 110 related to the payment card transaction.

Figure 2:
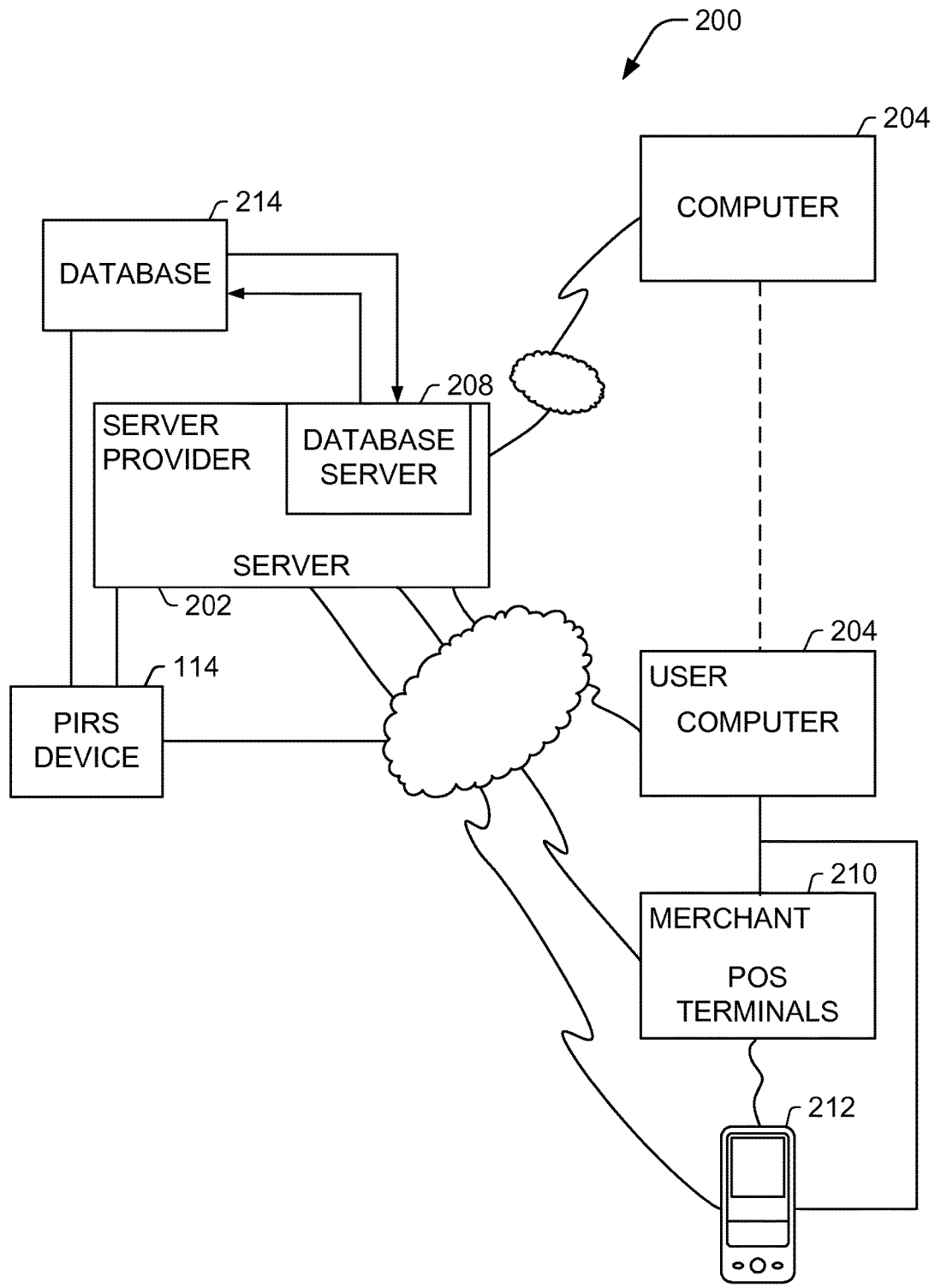

FIG. 2 is a simplified block diagram of an example payment processing system 200 in accordance with one embodiment of the present disclosure. In the example embodiment, payment processing system 200 includes a server, such as, payment processing server computing device 202, a plurality of client subsystems, also referred to as client systems 204 or client computing devices, connected to payment processing server computing device 202, and a PIRS device 114. As described in more detail with reference to FIG. 3, client systems 204 include computer systems of PIRS 101, computer systems of merchants (e.g., merchant 104), computer systems of acquirers (e.g., acquirer 106), and computer systems of one or more issuers (e.g., issuer 110). In one embodiment, client systems 204 are computers including a web browser, such that payment processing server computing device 202 and/or PIRS device 114 are accessible to client systems 204 using the Internet. Client systems 204 are interconnected to the Internet through many interfaces including a network, such as a local area network (LAN) and/or a wide area network (WAN), dial-in connections, cable modems, wireless-connections, and special high-speed ISDN lines. Client systems 204 include any device capable of interconnecting to the Internet including a mobile computing device, such as a notebook computer, a web-based phone, a personal digital assistant (PDA), or other web-connectable equipment.

In one embodiment, client computing device 204 includes a point-of-sale (POS) device 210, a cardholder computing device 212 (e.g., a smartphone, a tablet, or other computing device), or any other computing device capable of communicating with payment processing server computing device 202. A database server 206 is connected to a database 208 containing information on a variety of matters, as described below in greater detail. In one embodiment, database 208 is stored on payment processing server computing device 202 and is accessed by potential users at one of client systems 204 by logging onto payment processing server computing device 202 through one of client systems 204. In any alternative embodiment, database 208 is stored remotely from payment processing server computing device 202 and may be non-centralized. In at least some implementations, as described in more detail herein, PIRS device 114 stores data to, and retrieves data from, database 208.

Figure 3:
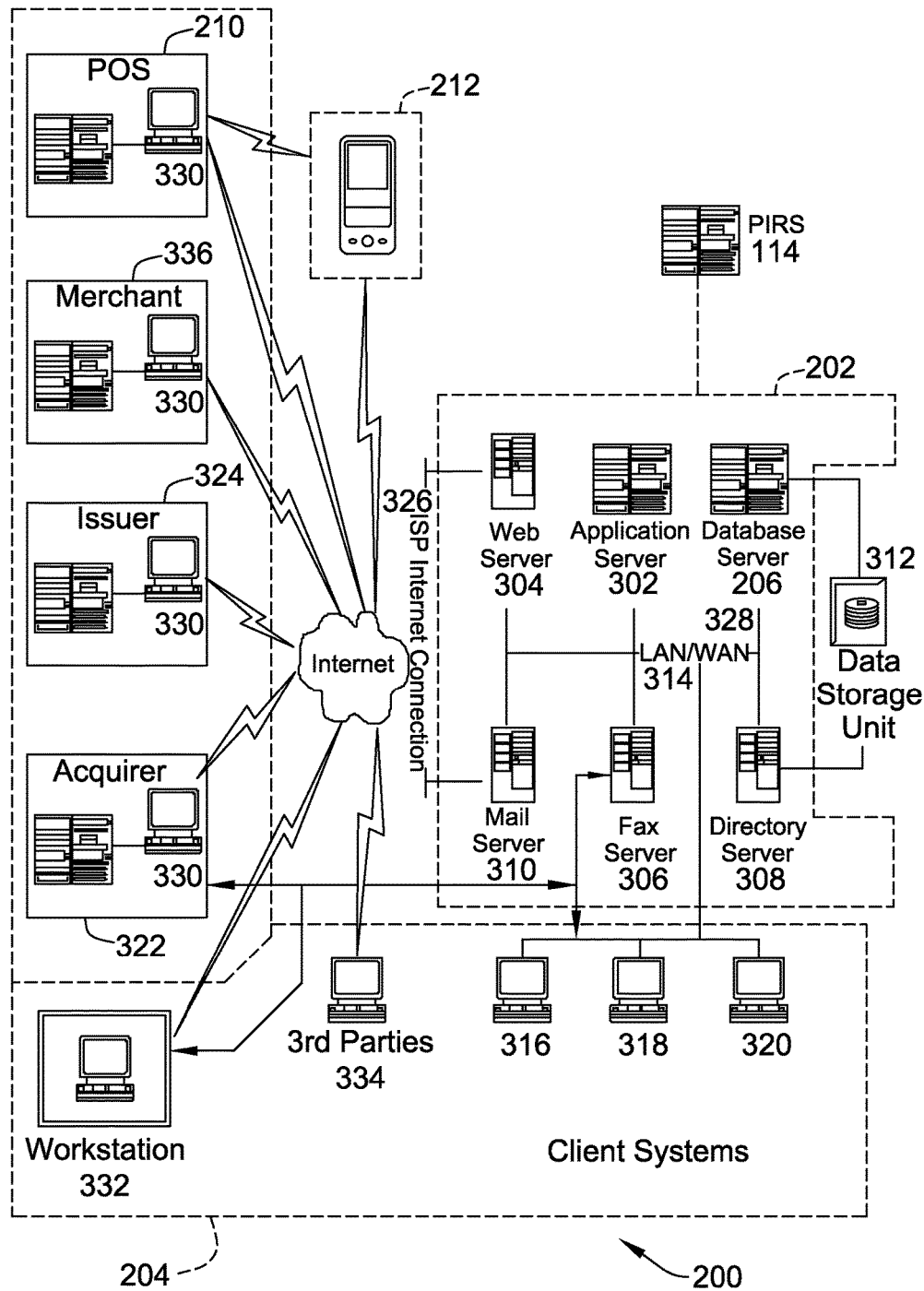

FIG. 3 is an expanded block diagram of an example embodiment of a server architecture of payment processing system 200 (shown in FIG. 2) in accordance with one embodiment of the present disclosure. Payment processing system 200 includes payment processing server computing device 202, client systems 204, and PIRS device 114. Payment processing server computing device 202 includes database server 206, an application server 302, a web server 304, a fax server 306, a directory server 308, and a mail server 310. An electronic storage unit 312 is coupled to database server 206 and directory server 308. Servers 206, 302, 304, 306, 308, and 310 are coupled in a local area network (LAN) 314. In addition, a system administrator's workstation 316, a user workstation 318, and a supervisor's workstation 320 are coupled to LAN 314. Alternatively, workstations 316, 318, and 320 are coupled to LAN 314 using an Internet link or are connected through an Intranet. In some implementations, PIRS device 114 is remote from payment processing server computing device 202 but communicatively coupled thereto. In other implementations, PIRS device 114 is incorporated into payment processing server computing device 202.

In one embodiment, each workstation, 316, 318, and 320, is a personal computer having a web browser. Although the functions performed at the workstations typically are illustrated as being performed at respective workstations 316, 318, and 320, such functions can be performed at one of many personal computers coupled to LAN 314. Workstations 316, 318, and 320 are illustrated as being associated with separate functions only to facilitate an understanding of the different types of functions that can be performed by individuals having access to LAN 314.

Payment processing server computing device 202 is configured to be communicatively coupled to various entities, including acquirers 322, issuers 324, and to third parties 334 (e.g., auditors) using an Internet connection 326. Payment processing server computing device 202 is also communicatively coupled with one or more merchants 336 and one or more ATMs 337. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 328, local area network 314 could be used in place of WAN 328. As described above, in some implementations, PIRS device 114 is remote from payment processing server computing device 202 but communicatively coupled thereto. In other implementations, PIRS device 114 is incorporated into payment processing server computing device 202.

In the example embodiment, any authorized individual or entity having a workstation 330 may access payment processing system 200. At least one of the client systems includes a manager workstation 332 located at a remote location. Workstations 330 and 332 include personal computers having a web browser. Furthermore, fax server 306 communicates with remotely located client systems, including manager workstation 332, using a telephone link. Fax server 306 is configured to communicate with other client systems 316, 318, and 320 as well.

Figure 4:
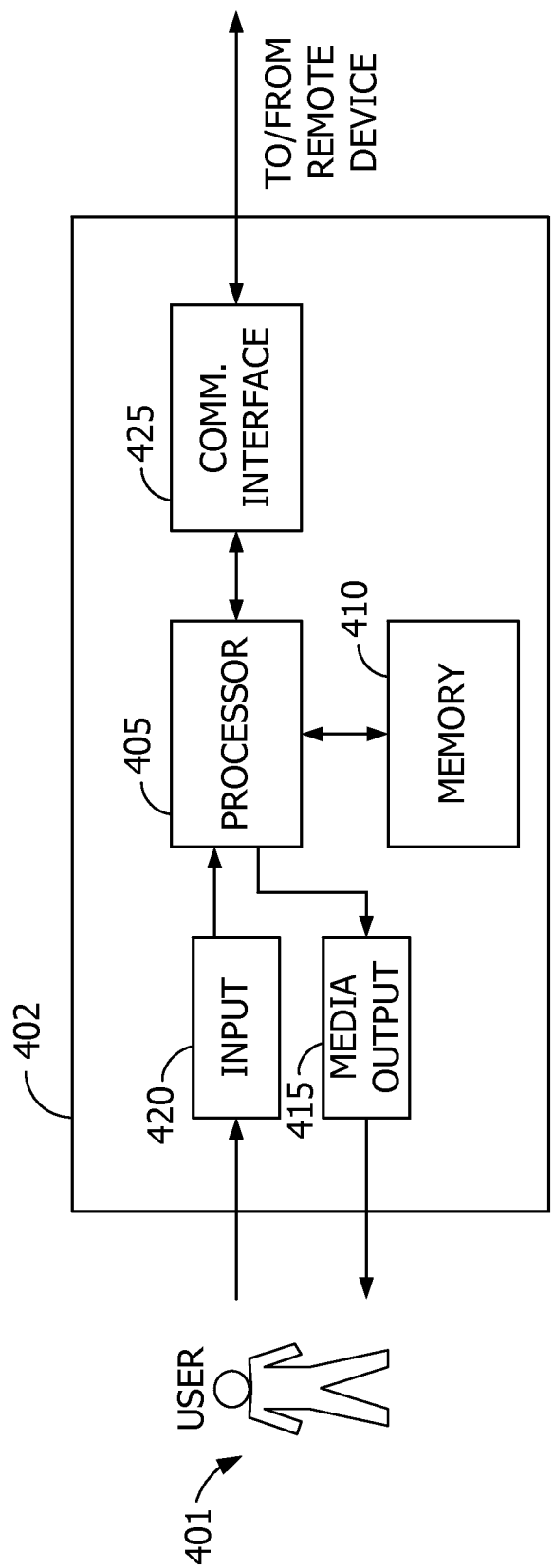

FIG. 4 illustrates an example configuration of a client computing device 402. Client computing device 402 may include, but is not limited to, client systems ("client computing devices") 204, 316, 318, 320, 330, manager workstation 332, and third party computing devices 334 (shown in FIG. 3).

Client computing device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or other data to be stored and retrieved. Memory area 410 may include one or more computer-readable media.

Client computing device 402 also includes at least one media output component 415 for presenting information to a user 401 (e.g., a cardholder 102). Media output component 415 is any component capable of conveying information to user 401. In some embodiments, media output component 415 includes an output adapter such as a video adapter and/or an audio adapter. An output adapter is operatively coupled to processor 405 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 402 includes an input device 420 for receiving input from user 401. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Client computing device 402 may also include a communication interface 425, which is communicatively couplable to a remote device such as payment processing server computing device 202 or a web server operated by a merchant. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 401 via media output component 415 and, optionally, receiving and processing input from input device 420. A user interface may include, among other possibilities, a web browser and client application. Web browsers enable users 401 to display and interact with media and other information typically embedded on a web page or a website hosted by a web server (e.g., web server 304). A client application allows users 401 to interact with an application server (e.g., application server 302).

Figure 5:
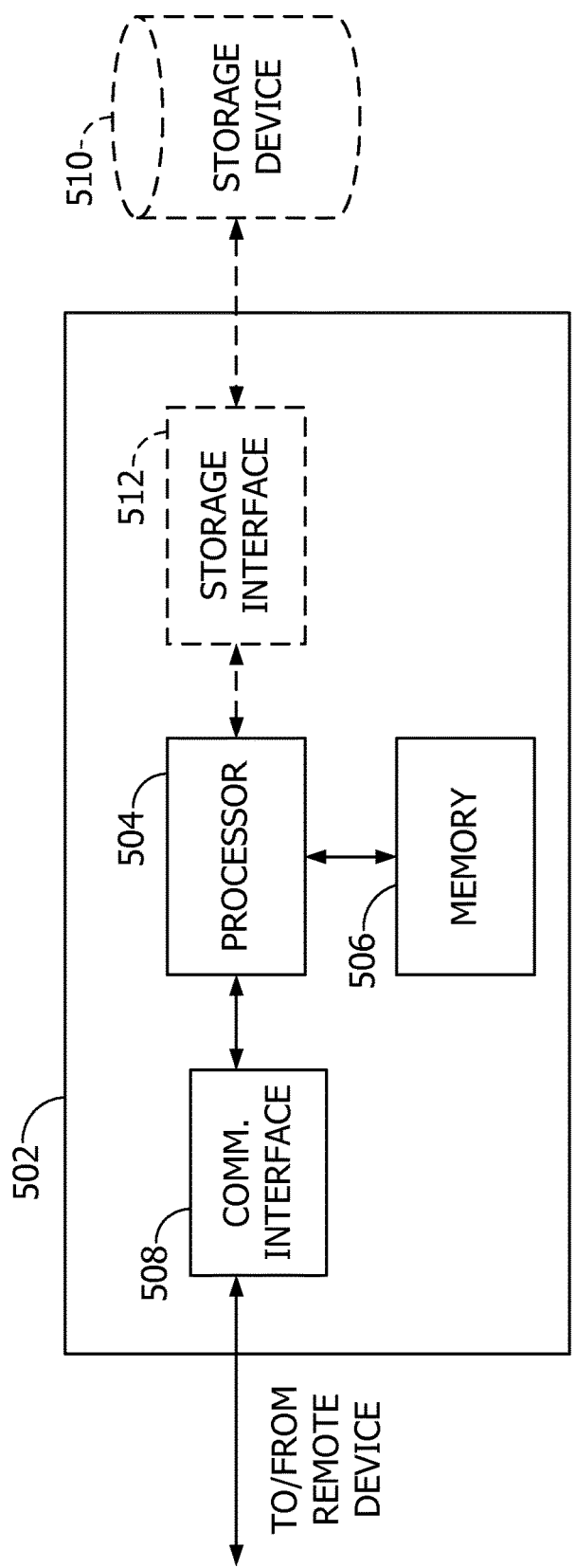

FIG. 5 illustrates an example configuration of a server computing device 502. Server computing device 502 is representative of payment processing server computing device 202 (shown in FIGS. 2 and 3), database server 206, application server 302, web server 304, fax server 306, directory server 308, mail server 310, and one or more computing devices included in PIRS device 114.

Server computing device 502 includes a processor 504 for executing instructions. Instructions may be stored in a memory area 506, for example. Processor 504 may include one or more processing units (e.g., in a multi-core configuration).

Processor 504 is operatively coupled to a communication interface 508 such that server computing device 502 is capable of communicating with a remote device such as client computing device 402 or another server computing device 502. For example, communication interface 508 may receive requests from client systems 204 via the Internet, as illustrated in FIGS. 2 and 3.

Processor 504 may also be operatively coupled to a storage device 510. Storage device 510 is any computer-operated hardware suitable for storing and/or retrieving data. In some embodiments, storage device 510 is integrated in server computing device 502. For example, server computing device 502 may include one or more hard disk drives as storage device 510. In other embodiments, storage device 510 is external to server computing device 502 and may be accessed by a plurality of server computing devices 502. For example, storage device 510 may include multiple storage units such as hard disks or solid state disks in a redundant array of inexpensive disks (RAID) configuration. Storage device 510 may include a storage area network (SAN) and/or a network attached storage (NAS) system.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory areas 410 and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
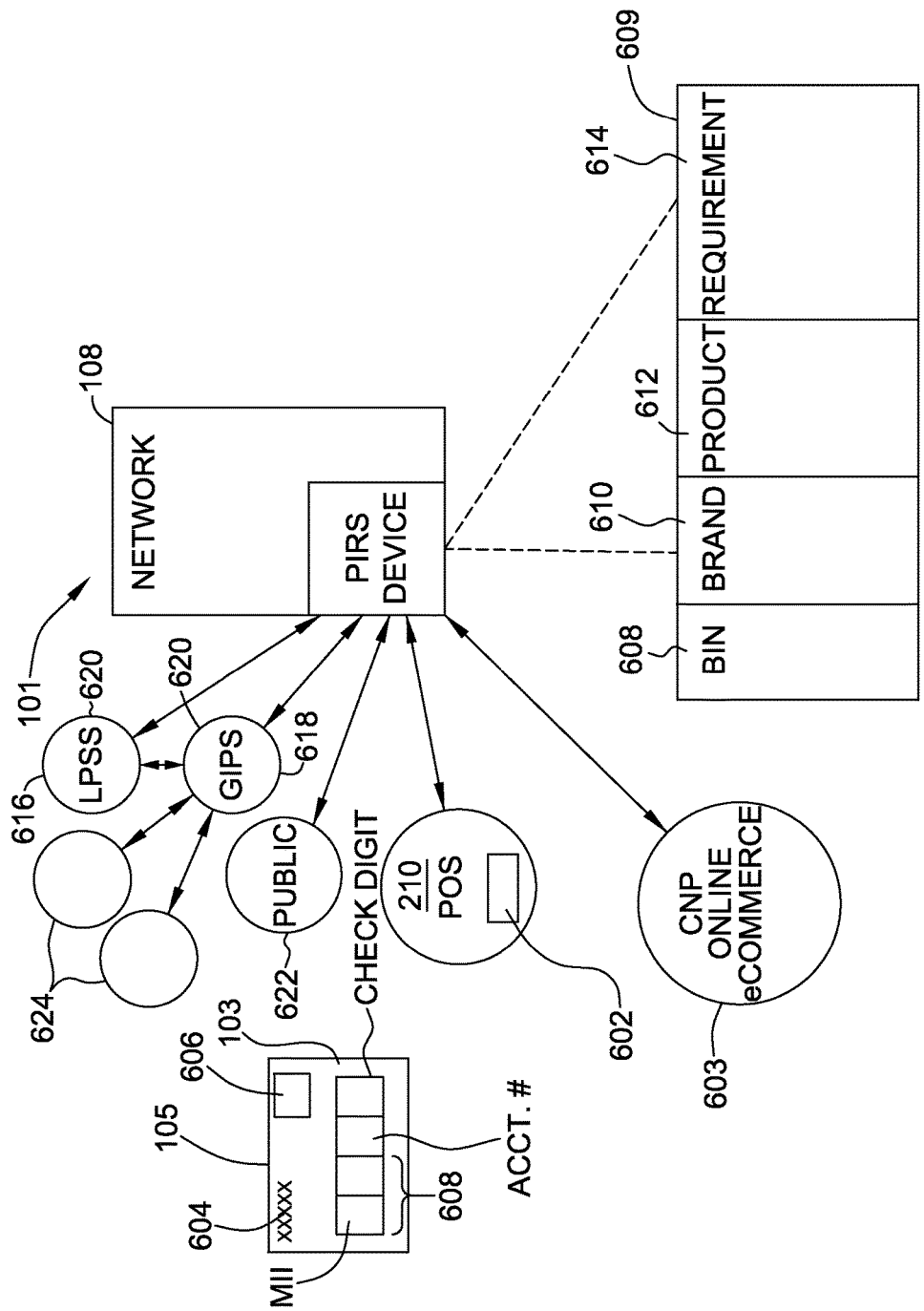

FIG. 6 is a data flow diagram for PIRS 101 (shown in FIG. 1). In the example embodiment, PIRS 101 is a computer system configured to identify a brand and/or a product in a payment card transaction and provide instructions for processing and routing the messages associated with the payment card transaction. Typically, payment card transactions using multi-party payment card transaction system 100 are initiated at POS device 210 in a card present transaction. POS device 210 typically includes a small amount of POS memory 602 to store special processing instructions for processing payment card transactions associated with various products or brands of merchants 104 and/or issuers 110. Because the amount of POS memory 602 in a POS device 210, only a limited number of special processing instructions can be stored in POS memory 602 at POS device 210. As the desire for greater and more complex special processing instructions increases, the more difficult it will be to accommodate the additional special processing instructions. An increasing number of payment card transactions are also initiated as card-not-present (CNP) transactions 603, such as, but not limited to, mobile device transactions, phone transactions, online transactions, card on file transactions and periodic transactions.

Currently, when a payment device, such as, but not limited to payment card 105 is swiped, dipped, tapped or bumped at POS device 210, POS device 210 reads a numeric identifier 604 from payment card 105, which may be printed, embossed, stored in magnetic stripe 103, or in a memory 606 of payment card 105, in the case of a smart card or other payment card 105 having an ability to electronically store numeric identifier 604. Numeric identifier 604 is typically referred to a primary account number (PAN) that may currently be 8-19 digits long and include several fields reserved for particular uses. For example, when following the International Organization for Standardization (ISO) standards, the first six digits are referred to as an Issuer Identification Number (IIN) or Bank Identification Number (BIN) 608, the first digit of which is Major Industry Identifier (MII). The IIN identifies the institution that issued the card to the cardholder. The next field, which may be of a variable length, identifies an individual account. A single check digit typically occupies the last digit.

Using PIRS 101, a lookup to a look-up table 609 is performed when payment card 105 is for example, swiped at POS device 210. BIN 608 (first few digits of the PAN) is transmitted to PIRS device 114 that looks up routing information in look-up table 609. The routing information may include the brand 610 (MasterCard or any other payment scheme), the product 612 (World Elite card, etc.) and processing requirements 614, which may also include special processing instructions. This information is then sent back to POS device 210 via a return message, which, with that information, POS device 210 can then acquire the data required by the information received in the return message and complete the payment card transaction. POS device 210 needs that information because certain cards may require the user to enter certain information at POS device 210. For example, some payment card Brands or Products may require the user to enter a zip code. Other payment card Brands or Products may be a fleet payment card used by a driver. These fleet cards may require the driver to put in his/her license plate number, may require the items being purchased to only be fuel (so the merchant needs to know that), or may not allow cash back, etc.

Merchants 104 and others need to know, at the time of the payment card transaction, brand and product information to make decisions on how to handle the payment card transaction. For example, merchants 104 need to know, if a payment card transaction is a debit or a credit transaction, if the payment card transaction is regional, domestic or global, if cash-back payment card transactions are allowed, and the like.

PIRS 101 provides product and routing information to other systems, platforms, and potentially between local payment systems/schemes (LPSS) 616, or even broader, on a global basis, for all ISO 7812 IINs/BINs, and to merchants 104 and other participants of payment card transaction system 100. In PIRS 101, routing and product data (e.g. BIN 608, product codes (World Elite, Prepaid Gift Card, Commercial Fleet etc.)) and acceptance brands (MasterCard, Maestro, Cirrus etc.), and a preference or requirements of the brand for certain transaction circumstances are accessible from a central store, such as PIRS device 114, or are propagated through various systems, and applications are updated to do real-time lookups for transaction information. PIRS 101 provides a real-time system that allows routing and product information to be updated in almost real-time. If BIN 608 or account range is currently defined as a standard product associated with a payment card network provider, but needs to be, for example, a different defined product, updates are made in the core configuration systems, the updates are pushed to one or more PIRS devices 114, and the next time a payment card transaction occurs, the lookup at PIRS device 114 returns the new product type of the differently defined product to payment card transaction system 100. The timing and caching of this information is controlled using a Time-to-Live (TTL) concept.

The exact data and format of response message from PIRS 101 to a query can be defined and may even be a defined industry standard for interoperability. Alternatively, a proprietary format that is used internally may be used to map or migrate the data for external use. In some embodiments, external implementation uses a global standard that is defined for all participants to follow for the content and format of the response data to queries. Standardization is able to accommodate a wide variation of brands and schemes, and other parameters.

To enable real-time updating of product information (credit card, debit card, prepaid card, or commercial card, etc.) and handling real-time routing decisions for payment card transactions, a real-time lookup of additional information relating the special processing instructions for each payment card 105 or device adds newly required functions to POS device 210 to accommodate the additional special processing instructions. Edge devices, central processes and all internal platforms of payment card transaction system 100 can use PIRS 101 to determine the correct payment card product type and routing information. This can be especially useful as tokenization, in which an artificial account number (token) is printed, stored or transmitted in place of the true account number, becomes more prevalent. Additionally, as product types and/or routing decisions move to real-time basis concepts, routing tables held in flat files or in POS memory 602 will no longer meet business needs.

In one embodiment, PIRS 101 is configured to be used with a specific Payment System/Scheme (PSS), such as, LPSS 616. In another embodiment of PIRS 101, a Global Inter-Payment Systems/Schemes (GIPS) 618 is configured to be used with multiple Payment Systems/Schemes (PSS) 620 for inter-payment system/scheme operations and this can be extended, in whole or with certain limitations, to be public access, with a focus on, but not limited to, merchants 104 and others involved in the acceptance and processing of payment card transaction.

In the example embodiment, PIRS 101 may be used to share product and routing information between PSSs, such as, but not limited to LPSS 616, GIPS 618, and PSS 620. PIRS 101 replaces the known flat/bulk file exchanges that are used today with real-time lookups and timed caching of information. PIRS 101 enables each participating PSS 620 to manage their product and routing information in real time. While PSS 620 participants might want to share more information just with other PSSs 620, a limited set of product and routing information can be made available to the public 622. This permits merchants 104 or other entities involved in the processing of payment card transactions, to retrieve real-time information needed to handle the payment card transactions, which may be different, based on the product type (credit card, debit card, prepaid card, or commercial card, etc.), geography (regional, domestic or international), and routing options (to which network can the payment card transaction be submitted).

Queries to look-up table 609 at the time of the payment card transaction simplify the systems of payment card transaction network 108 and permit real-time use of the payment card transaction data, as well as having a more efficient method to block or manage payment card transactions in the event of sanctions or customer risk management situations. Interface processors of PIRS devices 114 do not wait for periodic broadcasts with updates, rather all interface processors receive, via lookup, near real-time PIRS data.

In various embodiments, access to PIRS data by customers via the payment card transaction network 108 is permitted. Customer hosts are able to execute real-time look ups of PIRS data. Such access facilitates tokenization and enables a move away from a use of BINS 608 (requiring and depending on ecosystem changes as well) and the ability to change important product information in real-time.

In the example embodiment, using PIRS 101, each PSS 620 can broadcast their own routing information to PIRS 101 and receive from all other participating PSS 620 the same information. All participants benefit from having the real-time information. In one embodiment, more widespread delivery is possible using PIRS 101 by broadcasting the entire global IIN/BIN assignment data and make it available to the world of participating PSSs 620 and or individual IIN/BIN assignment recipients. For merchants, all or some subset of PIRS data is made available. As more terminals become connected/interactive, there is the potential that acquiring such data could be a pre-transaction, separate to any authorization call-out/look-up. Given the regulatory demands in Europe for merchants to know the type of card (credit/debit/commercial) at the time of the payment card transaction, using PIRS data could be a quick solution for online or "card not present" transactions.

Using PIRS 101, the need to manage the files and updates are removed and replaced with real-time look ups on a per transaction basis. Large payment card processors are able to establish and run their own PIRS devices 114 to support their clients and customers.

Access to PIRS 101 is also available to merchants 104 or others in the transaction processing ecosystem. Merchants 104 need to know what type of card is being used before the payment card transaction takes place to determine handling of the payment card transaction and subsequent routing. For example, whether cash back should be offered or whether they will accept the type of card (as an example but not limited to European regulation where a merchant may only accept debit cards but not credit cards). Initially, this is a better solution for online/ecommerce situations whereby a separate call out or PIRS inquiry is relatively simple to do from the web site, but with more connected terminals it can be applied to physical point of interaction (POI) situations as well. This facilitates avoiding hard coding of BINs 608 to determine product types (as examples but not limited to Commercial/Fleet or Debit MasterCard within Europe) and resolve many concerns that merchants and others have with the difficulty in determining product type and cost of acceptance in real-time.

Figure 7:
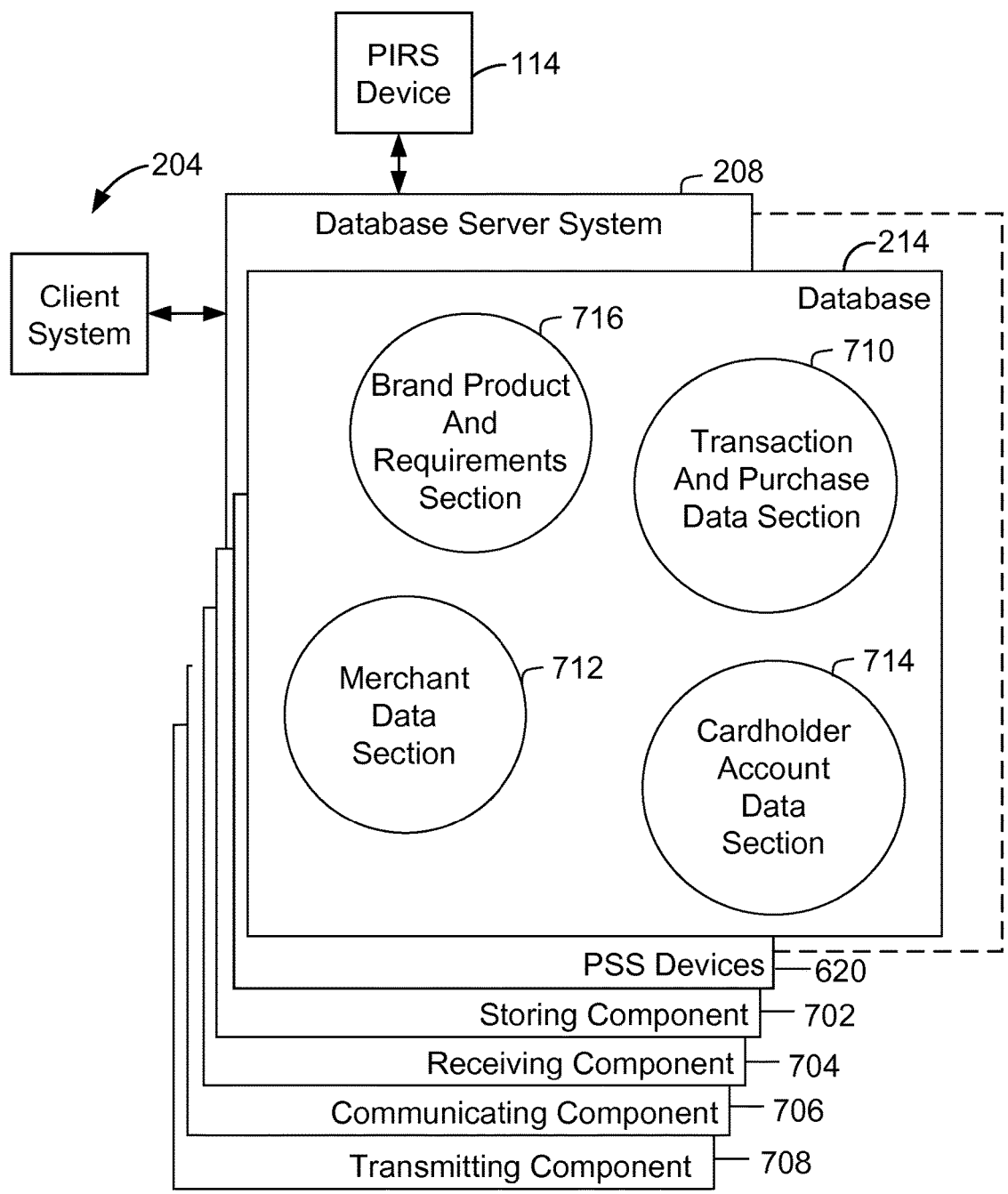

FIG. 7 shows a configuration of database 214 associated with database server 208 of payment processing server computing device 202 with other related server components. More specifically, FIG. 7 shows the configuration of database 214 in communication with database server 208 of payment processing server computing device 202 shown in FIGS. 2 and 3. Database 214 is coupled to several separate components within payment processing server computing device 202, which perform specific tasks.

Payment processing server computing device 202 includes a storing component 702 configured to store one or more payment card transaction instructions at a central store. The payment card transaction instructions are received from an entity responsible for a plurality of payment cards usable with the POI device and are associated with at least one of a brand and a product of the entity. Payment processing server computing device 202 also includes a receiving component 704 configured to receive from a merchant, a payment card identifier that includes a plurality of fields before or during a payment card transaction. Payment processing server computing device 202 further includes a communicating component 706 configured to communicate to the central store at least a portion of one or more of the plurality of fields. Payment processing server computing device 202 also includes a transmitting component 708 configured to transmit payment card transaction instructions to the POI device from the central store that correspond to the one or more payment card transaction instructions associated with the payment card identifier.

In an example embodiment, database 214 is divided into a plurality of sections, including but not limited to, a Transaction and Purchase Data Section 710, a Merchant Data Section 712, a Cardholder Account Data Section 714, and a Brand/Product/Requirement section 716. These sections within database 120 are interconnected to update and retrieve the information as required.

Figure 8:
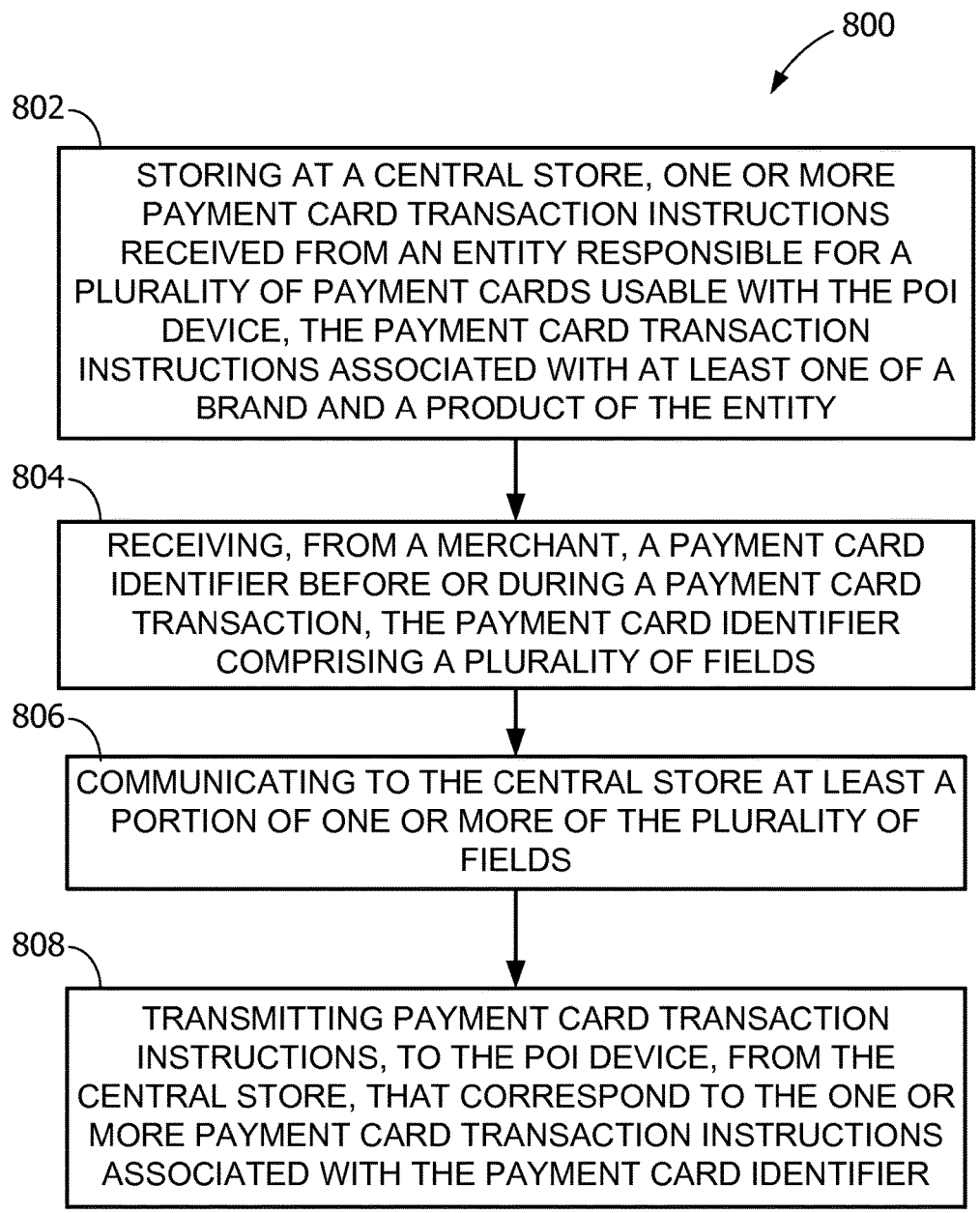

FIG. 8 is a flow chart of a method 800 of managing payment card transaction instructions at a point of interaction (POI) device communicatively coupled to a payment card network. In the example embodiment, the method is implemented using a computer device coupled to a memory device. The method includes storing 802 at a central store, one or more payment card transaction instructions received from an entity responsible for a plurality of payment cards usable with the POI device, the payment card transaction instructions associated with at least one of a brand and a product of the entity. Method 800 also includes receiving 804 a payment card identifier before or during a payment card transaction wherein the payment card identifier includes a plurality of fields. Method 800 further includes communicating 806 to the central store at least a portion of one or more of the plurality of fields, and transmitting 808 payment card transaction instructions, to the POI device, from the central store, that correspond to the one or more payment card transaction instructions associated with the payment card identifier.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by mobile devices, clusters, personal computers, workstations, clients, servers, and processor 205, 305 wherein the memory includes RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network. The technical effect of the methods and systems may be achieved by performing at least one of the following steps: (a) storing at a central store, one or more payment card transaction instructions received from an entity responsible for a plurality of payment cards usable with a POI device wherein the one or more payment card transaction instructions are associated with at least one of a brand and a product of the entity, (b) receiving, from a merchant, a payment card identifier before or during a payment card transaction wherein the payment card identifier includes a plurality of fields, (c) communicating to the central store at least a portion of one or more of the plurality of fields, and (d) transmitting the one or more payment card transaction instructions to the POI device, from the central store, that correspond to the one or more payment card transaction instructions associated with the payment card identifier.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, the term "cloud computing" and related terms, e.g., "cloud computing devices" refers to a computer architecture allowing for the use of multiple heterogeneous computing devices for data storage, retrieval, and processing. The heterogeneous computing devices may use a common network or a plurality of networks so that some computing devices are in networked communication with one another over a common network but not all computing devices. In other words, a plurality of networks may be used in order to facilitate the communication between and coordination of all computing devices.

As used herein, the term "mobile computing device" refers to any of computing device which is used in a portable manner including, without limitation, smart phones, personal digital assistants ("PDAs"), computer tablets, hybrid phone/computer tablets ("phablet"), or other similar mobile device capable of functioning in the systems described herein. In some examples, mobile computing devices may include a variety of peripherals and accessories including, without limitation, microphones, speakers, keyboards, touchscreens, gyroscopes, accelerometers, and metrological devices. Also, as used herein, "portable computing device" and "mobile computing device" may be used interchangeably.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The above-described embodiments of a method and system of managing payment card transaction instructions at a point of interaction (POI) device provides a cost-effective and reliable means for associating special processing instructions with a brand of a payment card or a product offered by an issuer, acquirer, payment network, or other entity associated with the payment card transaction. More specifically, the methods and systems described herein facilitate receiving a portion of a primary account number (PAN) that is reserved for use by the payment card network, associating the portion of the PAN with special processing instructions required by the entity for processing the payment card transaction, transmitting the special processing instructions to the POI device prior to generating an authorization request message, and receiving additional information from the transaction prescribed by the special processing instructions. As a result, the method and system described herein facilitate providing a greater number of services for payment card transactions in a cost-effective and reliable manner.

This written description uses examples to describe the disclosure, including the best mode, and also to enable any person skilled in the art to practice the disclosure, including making and using any devices or systems and performing any incorporated methods. The patentable scope of the application is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-based method of managing payment card transaction instructions at a point of interaction (POI) device communicatively coupled to a payment card network, the method implemented using a computer device coupled to a memory device, the method comprising:
   storing at a central store, remote from the POI device, one or more payment card transaction instructions received from an entity responsible for a plurality of payment cards usable with the POI device, the one or more payment card transaction instructions associated with at least one of a brand program and a product program of the entity, the brand program and product program defining how the one or more payment card transactions are processed for the entity;
   receiving, from a merchant, a payment card identifier before or during a payment card transaction, the payment card identifier comprising a plurality of fields;
   communicating to the central store at least a portion of one or more of the plurality of fields;
   transmitting the one or more payment card transaction instructions to a memory location in the memory device of the POI device, from the central store, that correspond to the one or more payment card transaction instructions associated with the payment card identifier;
   applying the one or more payment card transaction instructions to the payment card transaction; and
   discarding the one or more payment card transaction instructions from the memory location after applying the one or more payment card transaction instructions using time-to-live (TTL) instruction, and replacing within the memory location newly received payment card transaction instructions for a next payment card transaction.

2. The computer-based method of claim 1, further comprising transmitting instructions to the POI device, from the central store that correspond to the one or more payment card transaction instructions prior to generating an authorization request message.

3. The computer-based method of claim 1, wherein storing at a central store, one or more payment card transaction instructions comprises storing the one or more payment card transaction instructions at the central store that is located at the payment card network.

4. The computer-based method of claim 1, wherein storing at a central store, one or more payment card transaction instructions comprises storing the one or more payment card transaction instructions at the central store that is located at a third party service provider.

5. The computer-based method of claim 1, wherein receiving a payment card identifier including a plurality of fields comprises receiving a payment card identifier including an identifier of the entity responsible for the plurality of payment cards usable with the POI device.

6. The computer-based method of claim 1, wherein transmitting the one or more payment card transaction instructions to the POI device comprises transmitting the one or more payment card transaction instructions associated with the entity defined by the payment card identifier.

7. The computer-based method of claim 1, wherein transmitting the one or more payment card transaction instructions to the POI device comprises transmitting the one or more payment card transaction instructions associated with the entity defined by at least one of a brand program and a product program associated with the payment card identifier.

8. The computer-based method of claim 1, further comprising receiving, from the POI device an authorization request message including information relating to compliance of the authorization request message with the transmitted one or more payment card transaction instructions.

9. A payment system product identification and routing service (PIRS) comprising:
  a computer device coupled to a memory device; and
  a central store comprising one or more payment card transaction instructions received from an entity responsible for a plurality of payment cards usable with a point of interaction (POI) device, the one or more payment card transaction instructions associated with at least one of a brand program and a product program of the entity, the brand program and product program defining how the one or more payment card transactions are processed for the entity,
  the computer device configured to:
  receive, from a merchant, a payment card identifier before or during a payment card transaction, the payment card identifier including a plurality of fields;
  communicate to the central store at least a portion of one or more of the plurality of fields;
  transmit the one or more payment card transaction instructions to a memory location in the memory device of the POI device, from the central store, that correspond to the one or more payment card transaction instructions associated with the payment card identifier;
  apply the one or more payment card transaction instructions to the payment card transaction, and
  discard the one or more payment card transaction instructions from the memory location, after applying the one or more payment card transaction instructions using time-to-live (TTL) instruction, and replacing within the memory location newly received payment card transaction instructions for a next payment card transaction.

10. The system of claim 9, wherein the computer device is configured to transmit instructions to the POI device that correspond to the one or more payment card transaction instructions prior to generating an authorization request message.

11. The system of claim 9, wherein the computer device is configured to store the one or more payment card transaction instructions at the central store that is located at the payment card network.

12. The system of claim 9, wherein the computer device is configured to store the one or more payment card transaction instructions at the central store that is located at a third party service provider.

13. The system of claim 9, wherein the computer device is configured to receive a payment card identifier including an identifier of the entity responsible for the plurality of payment cards usable with the POI device.

14. The system of claim 9, wherein the computer device is configured to transmit the one or more payment card transaction instructions associated with the entity defined by the payment card identifier.

15. The system of claim 9, wherein the computer device is configured to transmit the one or more payment card transaction instructions associated with the entity defined by at least one of a brand program and a product program associated with the payment card identifier.

16. The system of claim 9, wherein the computer device is configured to receive, from the POI device, an authorization request message including information relating to compliance of the authorization request message with the transmitted one or more payment card transaction instructions.

17. One or more non-transitory computer-readable storage media having computer-executable instructions embodied thereon, wherein when executed by at least one computer device, the computer-executable instructions cause the computer device to:
  receive, from a point of interaction (POI) device, a payment card identifier before or during a payment card transaction, the payment card identifier including a plurality of fields;
  communicate to the central store at least a portion of one or more of the plurality of fields;
  transmit the one or more payment card transaction instructions to a memory location in the memory device of the POI device, from the central store, that correspond to the one or more payment card transaction instructions associated with the payment card identifier, the one or more payment card transaction instructions associated with at least one of a brand program and a product program of the entity, the brand program and product program defining how the one or more payment card transactions are processed for the entity;
  apply the one or more payment card transaction instructions to the payment card transaction, and
  discard the one or more payment card transaction instructions from the memory location, after applying the one or more payment card transaction instructions using time-to-live (TTL) instruction, and replacing within the memory location newly received payment card transaction instructions for a next payment card transaction.

18. The computer-readable storage media of claim 17, wherein the computer-executable instructions further cause the computer device to transmit instructions to the POI device that correspond to the one or more payment card transaction instructions prior to generating an authorization request message.

19. The computer-readable storage media of claim 17, wherein the computer-executable instructions further cause the computer device to transmit the one or more payment card transaction instructions associated with the entity defined by the payment card identifier.

20. The computer-readable storage media of claim 17, wherein the computer-executable instructions further cause the computer device to receive a payment card identifier including an identifier of the entity responsible for the plurality of payment cards usable with the POI device.

\* \* \* \* \*

UNITED STATES PATENT AND TRADEMARK OFFICE
CERTIFICATE OF CORRECTION

PATENT NO. : 10,185,938 B2
APPLICATION NO. : 14/861525
DATED : January 22, 2019
INVENTOR(S) : Simon R. Dix Page 1 of 1

It is certified that error appears in the above-identified patent and that said Letters Patent is hereby corrected as shown below:

In the Specification

Column 4, Line 48, delete "UNIXO server" and insert therefor -- UNIX® server --.

Signed and Sealed this
Fifth Day of November, 2019

Andrei Iancu
*Director of the United States Patent and Trademark Office*